2,919,223

FUNGICIDAL COMPOSITIONS AND METHODS EMPLOYING PARACHLORO - ALPHA - IODOTOLUENE

Robert G. Baker, Huntington Beach, Calif., assignor to The Dow Chemical Company, Midland, Mich., a corporation of Delaware No Drawing. Application December 31, 1956
Serial No. 631,436

9 Claims. (Cl. 167—30)

The present invention relates to the culture and the protection of crops and is particularly concerned with a new agronomical practice and composition for improving the emergence, seedling growth and harvest of crop plants.

It is an object of the present invention to provide a new and improved agronomical practice for the culture of crops. Another object is the provision of a practice for protecting the roots of plants from the attack of soil-dwelling fungi. A further object is the provision of a novel composition adapted to be employed in the new practice for growing and protecting crops. Other objects will become apparent from the following specification and claims.

The new agronomical practice comprises treating soil or growth media with p-chloro-α-iodotoluene to benefit plants grown in the treated soil. Such practice protects the plants from the ravages of soil-dwelling fungi which attack their roots and improves the emergence and growth of seedlings as well as the crop harvest. p-Chloro-α-iodotoluene is a white crystalline solid having the formula

This compound is somewhat soluble in many organic solvents and of low solubility in water and is adapted readily and conveniently to be distributed in soil or growth media. Further, when so distributed, the compound accomplishes a rapid control of root-attacking fungi. It is among the advantages of the present invention that the compound permeates growth media for a short distance from the point of application depending upon the temperature, moisture content, compactness and physical consistency of the media. It is a further advantage that the compound is sufficiently persistent to accomplish the desired effect upon the soil-dwelling fungi but dissipates from the soil in a reasonable period of time.

The distribution of an effective dosage of p-chloro-α-iodotoluene in soil or growth media is essential for the practice of the present invention. In general, good results are obtained when the compound is distributed through the growth media in the amount of from about 6 to 150 parts or more by weight per million parts by weight of the medium. In field applications, the toluene compound may be distributed in the soil at a dosage of from 2.0 to 250 or more pounds per acre and through such a cross-section of the soil to provide for the presence therein of an effective concentration of the treating agent. In general field applications, it is usually preferred that the compound be distributed to a depth of at least 2 inches. In applications to the furrow seed row for the suppression of seedling diseases, it is desirable that the compound be distributed upon the surfaces of the furrow at a dosage of at least 2.0 pounds for each acre of soil surface in the furrow. Oftentimes it is desirable to distribute the compound to a depth of 24 or more inches to avoid reinfestation of the soil from deep-dwelling fungi.

In one embodiment of the invention, the treated soil is planted with the desired crop plant following the distribution of the toluene compound in the soil. Where minimum dosages of the toluene compound are distributed in soil, the treated soil may be immediately planted with the desired crop. Following the distribution of larger dosages of the toluene compound it is desirable that any planting operation not be carried out for a period of from several hours to several days, the exact period depending upon the concentration of the toluene compound in the soil and the resistance of the species concerned to the compound. Where the compound is employed for the treatment of the soil adjacent to the root systems of established plants having a resistance to the toluene compound and in side-dressing operations, the existing vegetation is not unfavorably effected by minimum effective concentrations of the toluene compound temporarily present in the soil.

The method of the present invention may be carried out by distributing the unmodified p-chloro-α-iodotoluene compound through the growth media as by impregnation. However, the present method also embraces the employment of a liquid or dust composition containing the toxicant. In such usage, the toluene compound may be modified with one or a plurality of additaments or soil treating or parasiticide adjuvants, including water or other liquid carriers, surface active dispersing agents and finely divided inert solids. Depending upon the concentration of toxicant, such augmented compositions are adapted to be distributed in the soil, or employed as concentrates and subsequently diluted with additional inert carrier to produce the ultimate treating compositions. The required amount of the toluene compound in the growth media conveniently may be supplied per acre treated in from 10 to 27,000 gallons or more of the liquid carrier or in from about 20 to 2,000 pounds or more of the solid carrier.

The exact concentration of the toluene compound to be employed in compositions for the treatment of growth media may vary provided the required dosage of effective agent is supplied.

The concentration of toxicant in organic solvent compositions employed to supply the desired dosage is generally from about 10 to 85 percent by weight. With aqueous compositions, the required dosage is generally supplied with compositions containing 0.1 to 50 percent by weight, although concentrations of 0.0001 percent by weight conveniently may be employed in irrigation treatments of soil. In dusts, the concentration of toxicant may be from 1 to 50 percent by weight, although concentrations as low as 0.1 percent by weight are sometimes employed. In compositions to be employed as concentrates, the toxicant oftentimes is present in a concentration of from 5 to 95 percent.

Liquid compositions containing the desired amount of the toluene compound may be prepared by dissolving the toxicant in an organic liquid such as acetone, toluene, methylene chloride, chlorobenzene and petroleum distillates or by dispersing the toxicant in water with the aid of a suitable surface-active dispersing agent such as an ionic or non-ionic emulsifying agent. The preferred organic solvent carriers are those which are adapted to accomplish the penetration and impregnation of the soil with the toluene compound and are of such volatility that they evaporate from the soil and leave little permanent residue therein. Particularly desirable carriers in this group are the petroleum distillates boiling almost entirely under 400° F. at atmospheric pressure and having a flash point above about 80° F.

The aqueous compositions may contain one or more water-immiscible solvents for the toluene compound. In such compositions, the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the toluene compound in the aqueous carrier to produce the desired composition. The surface active dispersing agents are generally employed in the amount of from 1 to 20 percent by weight of the combined weights of the agent and toxicant compound in the composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust composition, the p-chloro-α-iodo-toluene is dispersed in and on a finely divided inert solid such as talc, chalk, gypsum and the like. In such operations, the carrier is mechanically ground with the compound or wet with a volatile organic solvent solution thereof. Similarly, dust compositions containing the compound may be prepared from various of the solid surface active dispersing agents, such as bentonite, fuller's earth, attapulgite and other clays. Depending upon the proportion of ingredients, these dust compositions may be employed as concentrates and subsequently diluted with additional solid surface active dispersing agent or with talc, chalk or gypsum and the like to obtain the desired amount of active ingredient in a composition adapted to be employed for the treatment of soil. Also, such concentrate dust compositions may be dispersed in water with or without the aid of a dispersing agent to form aqueous soil treating compositions.

A further preferred embodiment of the present invention is a novel composition comprising soil in admixture with an effective concentration of p-chloro-α-iodo-toluene.

When operating in accordance with the present invention, the soil may be impregnated with the toluene compound or a composition containing the toxicant, in any convenient fashion, for example, by simple mixing with the soil, by applying to the surface of soil and thereafter dragging or discing into the soil to the desired depth, or by employing a liquid carrier to accomplish the penetration and impregnation. In another method, the compound is distributed upon the surfaces of the seed furrow and the furrow thereafter planted and compacted about the seed. In general, it is desirable that the distribution be carried out at a soil temperature of 45° F. or higher since the effectiveness of the toluene compound may be somewhat reduced at lower temperatures.

In a preferred embodiment, the method of the present invention is carried out in soil having a moisture content of from about 40 to 100 percent of the moisture equivalent of the soil. When operating under such soil conditions, maximum improvements in crop yields and control of fungi are obtained. Thompson, L. M., in "Soils and Soil Fertility," McGraw Book Co., Inc. (1952), defines the moisture equivalent of a soil as equal to the percentage of water retained by wet soil after being centrifuged at 1000 times gravity. This equivalent is about the same as the so-called field capacity which may be defined as the moisture condition of the soil when downward movement of water into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicant at a soil moisture content equal to the moisture equivalent. In such method, the toluene compound readily and conveniently may be distributed to a depth of from two to four feet or more to avoid reinfestation from deep-dwelling organism.

The expressions "growth media" or "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any solid substances or media in which vegetation may take root and grow, and are intended to include not only earth but compost, manure, muck, humus, and sand and the like, adapted to support plant growth.

The following examples illustrate the invention but are not to be construed as limiting the same.

*Example 1*

An acetone solution containing 3 grams of p-chloro-α-iodotoluene per liter was employed for the treatment of sandy loam soil heavily infested with the organisms *Fusarium solani phaseoli* and *Rhizoctonia solani*. At the time of treatment, the soil had a moisture content of about 7.0 percent, the latter being about 50 percent of the field capacity of the soil. In the treating operations, the soil was placed in sealable containers and separately injected with the acetone composition in an amount sufficient to supply 10 parts by weight of the p-chloro-α-iodotoluene compound per million parts by weight of soil. Following the treatment, the containers were sealed and the soil therein mechanically mixed to insure uniform distribution of the toxicant composition. After mixing, the containers of treated soil were incubated at the average temperature of 22° C. In a check operation, sealed containers containing the same infested but untreated soil were exposed to identical conditions as the treated soil.

After three days, the containers were opened and portions of the treated and untreated soil cultured by the dilution plate method as described by J. P. Martin in "Soil Science," 69, No. 3, pp. 215–32 (March 1950) to determine the precent control of fungal organisms. In the latter operations, the culturing medium employed was a peptone dextrose agar (1000 milliliters of water, 10 grams of dextrose, 5 grams of peptone, 1 gram of $KH_2PO_4$, 0.5 grams of $MgSO_4 \cdot 7H_2O$ and 20 grams of agar) containing 0.069 gram of rose bengal and 0.030 gram of streptomycin per liter of ultimate mixture. In the plating operations, the culturing medium was incorporated with about 0.5 gram of soil sample per liter of medium and the plates thereafter poured in replicates of three for the treated and check soils. The poured plates were then incubated for three days at 25° C.

After incubation, the plates were examined and counts of fungal colonies made in order to determine the percent control of the fungal organisms. From the examination there was found a substantially complete control of fungal organisms in the soil treated with the p-chloro-α-iodotoluene. The check plates were found to support the growth of many colonies of the named fungal organisms.

*Example 2*

Fifty parts by weight of p-chloro-α-iodotoluene, 45 parts of xylene and 5 parts of a dimeric alkylated aryl polyether alcohol (Triton X–155) are mixed together to prepare a concentrate composition in the form of an emulsifiable liquid.

Also, 90 parts by weight of p-chloro-α-iodotoluene and 10 parts of a sorbitan monolaurate polyoxyethylene derivative (Tween 20) are mechanically mixed together to prepare a water-dispersible concentrate composition.

These compositions are adapted to be dispersed in water to produce aqueous compositions having desirable wetting and penetrating properties. The latter compositions are adapted to be employed to treat soil and to distribute p-chloro-α-iodotoluene therein in effective concentrations.

*Example 3* p-Chloro-α-iodotoluene is dispersed on and in a finely divided silicon dioxide aerogel (Hi Sil) to produce a composition containing 84 grams of toxicant per 1000 grams of ultimate mixture. This composition is employed for the treatment of seed beds containing a sandy loam soil infested with *Fusarium solani phaseoli* and *Rhizoctonia solani*. At the time of treatment, the soil has a moisture content equal to about 75 percent of field capacity. Prior to treatment, the soil is furrowed for seeding with beans. In the treating operations, the bottoms and sides of the furrows are dusted with the composition at a dosage of 50 grams of composition per 100 feet of open furrow. Immediately following the treatments, bean seeds are planted in the furrows and the soil compacted about the seeds according to conventional practices. In a check operation, seed beds of the same infested but untreated soil are similarly planted with beams. During the subsequent growing period, there is observed no adverse effect upon germination and growth of seedlings attributable to the toluene compound.

At intervals the seed beds are inspected to determine the percentage emergence of bean seedlings. From the observations there is found a substantially complete emergence of bean seedlings in the treated rows with an emergence of 7 percent in the untreated check rows.

*Example 4*

A seed bed containing a sandy loam soil heavily infested with the fungus organisms *Fusarium solani phaseoli* and *Rhizoctonia solani* was furrowed and the furrows planted with cotton seeds. At the time of the planting the soil in the seed beds had a moisture content substantially equal to the field capacity. Following the planting operation a composition comprising 0.014 pound by weight of p-chloro-α-iodotoluene in intimate mixture with 100 pounds of sandy loam soil containing a heavy infestation of the above fungus organisms was distributed and compacted about the seeds in the planted furrows at a rate of 0.24 pound of p-chloro-α-iodotoluene per 100 feet of furrow. In a check operation, seed beds of the same infested but untreated soil were planted with cotton.

At intervals the seeds beds were inspected to determine the percentages emergence of cotton seedlings. From the observations there was found a substantially complete emergence of cotton seedlings in the treated rows and an emergence of 11 percent in the untreated checks.

*Example 5*

The water-dispersible concentrate composition of Example 2 is dispersed in water to prepare a composition containing about 100 pounds of p-chloro-α-iodotoluene per 200 gallons of ultimate mixture. The latter composition, while under agitation, is metered into irrigation water at the pump outlet at the rate of 2 gallons per 1000 gallons of irrigation water. The water is in a state of turbulent flow as it comes from the pump which provides thorough mixing of the toxicant therein. About 3 acre inches of irrigation water is applied to land heavily infested with *Fusarium solani phaseoli,* and *Rhizoctonia solani* to accomplish a wetting of the soil to a depth of about 12 inches. Two weeks after treatment, the soil is planted with lima beans. In a check operation, adjacent but similarily infested soil is also planted with lima beans. Seven weeks after seeding, the plots are inspected and representative plants lifted from the soil and their roots are examined for evidence of root-rot disease. The examination indicates a commercial control of the complex of root-rot fungi in the treated soil with heavy infestation in the check plot.

I claim:

1. An agronomical practice which comprises impregnating soil with a fungicidal amount of p-chloro-α-iodotoluene and thereafter planting the treated soil.

2. In the practice of agricultural economy for the control of soil-dwelling fungi, the method which comprises impregnating soil with p-chloro-α-iodotoluene in amount of at least 6 parts by weight per million parts by weight of soil.

3. In the practice of plant husbandry, a method for the control of soil-dwelling fungi which comprises impregnating field soil with a composition made up of p-chloro-α-iodotoluene in intimate admixture with a fungicide adjuvant as a carrier therefor, the impregnation being carried out so as to provide at least 6 parts by weight of the toluene compound per million parts by weight of soil.

4. A concentrate composition comprising p-chloro-α-iodotoluene in intimate admixture with an inert finely divided solid, the toluene compound being present in the amount of from 1 to 50 percent by weight of the composition.

5. A concentrate composition comprising p-chloro-α-iodotoluene in intimate admixture with a surface active dispersing agent, the toluene compound being present in the amount of from 80 to 99 percent by weight of the composition.

6. A concentrate composition comprising p-chloro-α-iodotoluene in intimate admixture with a petroleum distillate, the toluene compound being present in the amount of from 10 to 85 percent by weight of the composition.

7. An aqueous dispersion of the composition claimed in claim 5, the toluene compound being present in the amount of at least 0.0001 percent by weight of the composition.

8. In the practice of plant husbandry, a method for the control of soil-dwelling fungi which comprises impregnating field soil with a composition made up of p-chloro-α-iodotoluene in intimate admixture with a petroleum distillate, the impregnation being carried out so as to provide at least 6 parts by weight of the toluene compound per million parts by weight of soil.

9. A composition which comprises parachloro-alpha-iodotoluene as an active fungicidal ingredient in intimate admixture with an agricultural adjuvant.

References Cited in the file of this patent

UNITED STATES PATENTS

| | | |
|---|---|---|
| 2,191,301 | Smith | Feb. 20, 1940 |
| 2,614,919 | Warren et al. | Oct. 21, 1952 |

FOREIGN PATENTS

| | | |
|---|---|---|
| 956,156 | France | July 18, 1949 |

OTHER REFERENCES

Horsfall: Fungicides and Their Action, vol. II, 1945, Chronica Botanica Co., pp. 43, 44, 142.

Horsfall: Principles of Fungicidal Action, Chronica Botanica Co., 1956, pp. 93, 94, 99.

Frear: Chem. of the Pesticides, 3rd Ed. (1955) D. Van Nostrand, p. 128.

Frear: Catalogue of Insecticides and Fungicides, pub. Chronica Botanica Co., Waltham, Mass., 1947, vol. 1, p. 162.